United States Patent Office

3,719,521
Patented Mar. 6, 1973

3,719,521
POLYESTER AND GRADED ACRYLIC RUBBER-URETHANE-ACRYLATE PAINT AND PAINTING PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,392
Int. Cl. B44d 1/50
U.S. Cl. 117—93.31          10 Claims

ABSTRACT OF THE DISCLOSURE

A radiation-curable paint binder dispersion comprises vinyl monomers, an alpha-beta olefinically unsaturated polyester resin having molecular weight in excess of about 1,000, and the addition product of a hydroxy-functional, acrylic graded-rubber particle, a diisocyanate and a hydroxyalkyl acrylate. The dispersion is applied to substrates as a paint film and cured thereon by exposure to ionizing radiation, e.g. an electron beam.

---

A unique, rubber comprising, radiation-curable paint is provided by preparing a film-forming dispersion of vinyl monomers, an alpha-beta olefinically unsaturated polyester resin, and the addition product of a hydroxy-functional, acrylic graded-rubber particle, a diisocyanate and a hydroxyalkyl acrylate. The dispersion is applied to substrates, e.g. wood, metal, glass, shaped polymeric solid, etc., and cured thereon by ionizing radiation.

(I) THE POLYESTER RESIN COMPONENT

The alpha-beta olefinically unsaturated polyesters used herein advantageously have average molecular weight in the range of about 1,000 to about 20,000, preferably in the range of about 2,000 to about 10,000. The polyester advantageously has about 0.5 to about 5, preferably about 0.7 to about 3.5 units of alpha-beta olefinic unsaturation per 1,000 units molecular weight.

The polyesters used herein most commonly consist essentially of carbon, hydrogen and oxygen. In one embodiment, the polyesters are those formed from a polyhydric alcohol, e.g., neopentyl glycol, an alpha-beta olefinically unsaturated dicarboxylic acid and/or anhydride, e.g., maleic anhydride, and a dicarboxylic acid and/or anhydride wherein the acid groups and/or anhydride groups are attached to a ring structure, e.g., tetrahydrophthalic anhydride.

The term "alpha-beta olefinic unsaturation" as employed herein includes the olefinic unsaturation resulting from the incorporation of maleic acid or anhydride or other acid or anhydride of equivalent unsaturation for the purposes of polymerization, into a paint binder component. It also includes the more radiation sensitive olefinic unsaturation such as that provided by acrylic or methacrylic acid or esters thereof. Other acids and/or anhydride used in this embodiment include, but not by way of limitation, fumaric, itaconic, chloromaleic, dichloromaleic, etc.

The anhydride wherein the anhydride group is attached to a ring structure (aromatic or aliphatic) is selected from anhydrides that will not provide additional alpha-beta olefinic unsaturation units and the relative quantities of the two acids and/or anhydrides are adjusted to provide the desired concentration of such unsaturation. Suitable anhydrides for this purpose include, but not by way of limitation, phthalic, tetrahydrophthalic, cyclohexane dicarboxylic acid anhydride, etc.

The polyhydride alcohol is preferably a diol. Triols and other multi-hydric alcohols can be used but it is advisable to employ such alcohols in minor amounts with a diol, if they are used at all. Suitable diols include, but not by way of limitation, ethylene glycol, propylene glycol, 1,3-butylene glycol, 2-butene-1,4 diol, 1,4-butane glycol, 1,6-hexamethylene glycol, decamethylene glycol, dimethylol benzenes, dihydroxy ethyl benzenes, etc.

In another embodiment, the polyester used is a hydroxy terminated polyester that has been reacted with a hydroxyalkyl acrylate, e.g. hydroxyethyl methacrylate, etc. In this embodiment, the starting resin may be an alkyl type polyester which may, but preferably does not, have olefinic unsaturation. Those having olefinic unsaturation may be formed from the monomers listed for the first embodiment while in the saturated alkyds there is substituted succinic, adipic, or similar acid for the maleic or similarly unsaturated acid or anhydride used to prepare the unsaturated polyesters. One mole of these resins is then reacted with an average of about 2 molecules of a hydroxyalkyl acrylate.

The more sensitive unsaturation provided by the acrylate effectively reduces the significance of the maleic unsaturation, if any, in the resin. Hence, in such a resin, the practical concentration of alpha-beta olefinic unsaturation is the concentration provided by the acrylate.

In a third embodiment, the polyester is a urethane (diisocyanate) modified polyester.

In a fourth embodiment, the polyester is a siloxane-modified polyester.

(II) PREPARATION OF THE GRADED RUBBER PARTICLE

The graded rubber particle has a core of crosslinked, elastomeric, acrylic polymer, an outer shell comprising methyl methacrylate and a hydroxy-functional acrylate and an intermediate layer which is a copolymer of the monomers used to form the core and the monomers used to form the outer shell.

The process for preparing these particulate materials is at least a two-stage process. In one method of preparation, a major amount of mono-functional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter,. Before this reaction reaches substantial completion, i.e., when the reaction is between about 50 and about 90, preferably between about 70 and about 89, percent complete, the second stage monomeric component, i.e., a mixture of about 65 to about 99, preferably about 70 to about 95, mole percent methyl methacrylate, and about 1 to about 35, preferably about 5 to about 30 mole percent of a hydroxyalkyl acrylate or a mixture of about 1 to about 35, preferably about 5 to about 30 mole percent hydroxyalkyl acrylate and about 65 to about 99 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20°–30° C. The terms rubber-like and glass-like are, of course, meaningless except when used in reference to a specific temperature or temperature range.

The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or tri-functional monomer containing 2 or more non-conjugated terminal ethylenic groups. The monofunctional, alkyl, monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane, trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol. In another embodiment, the crosslinking agent is a triester or acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the crosslinking agent.

In the second stage reaction, it is preferred to use a mixture of about 65 to about 99, preferably about 70 to about 95 percent methyl methacrylate and about 1 to about 35, preferably about 5 to about 30, mole percent of hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monacrylates, e.g., esters of $C_2$–$C_8$ monohydric alcohols and either acrylic or methacrylic acid, or monofunctional vinyl hydrocarbons such as styrene and methyl substituted styrenes, e.g., alpha methyl styrene. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_6$ dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part, such as a hydrocarbon group containing 8 or more carbon atoms, and a hydrophilic part, such as alkaline metal or ammonium carboxylate groups, phosphate or sulfate partial ester groups, sulfonate groups, and the like period. Exemplary emulsifying agents include alkali metal sulfonates of styrene, naphthalene, decyl benzene and dodecyl benzene; sodium dodecyl sulfate; sodium stearate; sodium oleate; sodium alkyl aryl sulfonates; polyoxyethylene sulfates and phosphates; the ethylene oxide condensate with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner, further descrption is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent on a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded rubber particles above described and this method of preparation are disclosed by Ray A. Dickie and Seymour Newman in their patent application Ser. No. 100,464 filed of even date with this application.

In another method of preparation, hereinafter illustrated, the rubber particles are formed in an aliphatic hydrocarbon medium.

(III) THE DIISOCYANATE REACTANT

The preferred diisocyanate for use in this invention is toluene diisocyanate and this may be either the 2,4- or 2,6-isomer or a mixture thereof. This diisocyanate may be used without blocking or one of the isocyanate groups thereof may be blocked with caprolactam before use. One may also use other diisocyanates so long as one of the isocyanate groups is blocked with caprolactam or other suitable blocking agents. Representative of other diisocyanates which can be mono-blocked and used herein are the following: 4,4'-diphenylmethane diisocyanate, 1-phenoxy - 2,4 - phenylene diisocyanate, 1-tert-butyl-2,4-phenylene diisocyanate, and 1-ethyl-2,4-phenylene diisocyanate. Such blocking allows for separate stage reactions of the two isocyanate groups. Other blocking agents such as phenols and tertiary butyl alcohol may also be used. The blocking agents are selected so that the blocked isocyanate group is converted to free isocyanate group in a temperature range of about 120° to 170° C. Sometimes a catalyst such as triethylene diamine or stannous octoate may be added and advantageously used in 0.05 to 1 percent concentration (basis weight of reactants) to assist the deblocking process.

A diisocyanate can be monoblocked with caprolactam by reacting the two in toluene. When the first isocyanate group is blocked, the monoblocked product precipitates out of solution. See, Raymond R. Myers and J. S. Long, Film Forming Compositions, vol. 1, Part I, Page 485, published by Marcel Dekker Inc., New York, New York, USA (1961).

(IV) THE HYDROXYALKYL ACRYLATE REACTANT

A hydroxyalkyl acrylate is reacted with the second diisocyanate group in the next step of the process. This component is preferably employed in slight excess of the amount required to react with the remaining isocyanate groups. The preferred hydroxyalkyl acrylates are hydroxyethyl acrylate, hydroxyethyl methacrylate, hydroxypropyl acrylate, and hydroxypropyl methacrylate.

(V) VINYL MONOMERS EMPLOYED IN THE PAINT DISPERSION

The paint binder dispersion advantageously contains about 20 to about 80, preferably about 25 to about 75, weight percent vinyl monomers and about 20 to about 80, preferably about 25 to about 75, weight percent of the polymeric component. This polymeric component consists essentially of the rubber-urethane-acrylate addition product hereinbefore described and the alpha-beta, olefinically unsaturated polyester hereinbefore described. The relative concentrations of these two constituents of the polymeric component may vary widely, e.g., the polymeric component may comprise about 2 to about 98, preferably 5 to 95, weight percent of the alpha-beta olefinically unsaturated polyester and about 98 to about 2, preferably 95 to 5, weight percent of the rubber-urethane-acrylate product.

Monomer type and concentration provide one means for adjusting the viscosity of the paint dispersion to conform to the methods of application desired, e.g., spray coating, roll coating, etc. In functional terms, the amount of vinyl monomer present is at least sufficient to convert the alpha-beta, olefinically unsaturated rubber-urethane-acrylate addition product and the alpha-beta olefinically unsaturated polyester into a crosslinked continuous coating on the surface of a substrate when a film of such coating dispersion is exposed to ionizing radiation, e.g., electron beam.

Vinyl monomers employed may be monofunctional, monoacrylates formed by the esterification of acrylic or methacrylic acid and a $C_1$–$C_8$, preferably a $C_1$–$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent, of diacrylates, e.g., the diesters of acrylic or methacrylic acid and a $C_2$–$C_6$ diol such as 1,3-butylene diacrylate, 1,3-butylene dimethacrylate, 1,6-hexamethylene diacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(VI) PREPARATION AND APPLICATION OF THE COATING DISPERSION TO A SUBSTRATE

By adjusting the viscosity of the coating dispersion to a viscosity compatible with the desired method of coating, these coatings may be applied by any of the conventional methods, e.g., brushing, spraying, roll coating, curtain coating, flow coating, etc.

The viscosity of the paint binder solution can be adjusted by varying the molecular weight of the rubber-urethane-acrylate addition product. This may be accomplished by controlling the average number of functional groups per molecule through control of the concentration of the hydroxyalkyl acrylate constituent in the final portion of the monomer mixture introduced into the reaction medium when the graded rubber particle is produced. The viscosity may also be regulated by varying the relative concentration of the resin component with respect to the vinyl monomer component and/or by varying the relative concentrations of dissimilar monomers within the vinyl monomer component. The binder dispersion may be applied to the substrate essentially free of non-polymerizable, organic solvents and/or diluents or it may be applied with the solvent and/or diluents in a method of application wherein the solvents and/or diluents are flashed off prior to polymerization.

Coatings may be applied to any substrate, e.g., metal, wood, glass, polymeric solids, etc. These coatings will ordinarily be applied to an average depth in the range of about 0.1 to about 4 mils, more commonly about 0.5 to about 2 mils.

(VII) CURING THE COATINGS

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second on a workpiece, preferably a moving workpiece, with the coating receiving a total dose in the range of about 1 to about 25, commonly about 8 to about 15 mrad.

The term "ionizing radiation" as employed herein means radiation having sufficient energy to remove an electron from a gas atom, forming an ion, hence radiation with minimum energy of, or equivalent to, at least about 5,000 electron volts except when the curing is carried out in a vacuum. The preferred method of curing films of the instant paint binders on the substrates to which they have been applied is by subjecting such films to a beam of polymerization effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder, which is ultimately converted to a durable film resistant to wear, weather, etc. can be all or virtually all that is used to form the film or it can be a vehicle for pigmentary and/or mineral filler material.

The abbreviation "mrad" as employed herein means one million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passed through a metal window, e.g., aluminum, aluminum-copper alloy, or magnesium-thorium alloy of about 0.003 inch thickness. This invention will be more fully understood from the following examples:

EXAMPLE 1

(I) Graded rubber particles are prepared in aqueous medium using the following procedures: To 1,000 parts by weight water which has been boiled and cooled to room temperature under a nitrogen atmosphere are added 2.86 parts by weight sodium dodecyl sulfate dissolved in 35.7 parts by weight water and about ⅛ of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is begun at a rate such that the temperature of the reaction mixture is maintained at 47° to 50° C. During the addition of the last two thirds of the first monomer mixture, 5.72 parts by weight sodium dodecyl sulfate dissolved in 35.7 parts by weight water are added at a substantially constant rate. The reaction mixture is maintained at about 47° to 50° C. for about 60 minutes prior to beginning simultaneous dropwise addition of a mixture of 1180 parts by weight methyl methacrylate and 425 parts by weight hydroxyethyl methacrylate, 30 parts by weight dodecyl mercaptan, and 2.86 parts by weight sodium dodecyl sulfate dissolved in 35.7 parts by weight water. This addition, which requires about 30 minutes, is carried out at a rate such that the temperature of the reaction mixture is maintained at about 47° to 50° C. Following this addition, the mixture is maintained at 47° to 49° C. for an additional two hours. The emulsion is then coagulated by addition of 20 grams of concentrated hydrochloric acid solution and 100 ml. of water. The rubber particles are isolated by filtration and washed with methanol containing 1 weight percent of hydrochloric acid. The particles are then dried.

(II) Determination of the concentration of the reactive hydroxyl groups on the surfaces of the particles is made by the well known method of analysis wherein the hydroxy groups are reacted with acetic acid using a pyridine catalyst. The acetic acid is then back titrated with sodium hydroxide. For details reference is made to A. Steyermark, Quantitative Organic Analysis, pp. 302–303, published by Blakiston Company, New York, Toronto, and Philadelphia (1951).

(III) The hydroxy-functional graded rubber particles prepared in I above are reacted with a diisocyanate using the following procedure: The hydroxy-functional particles in the quantity providing 1 mole of reactive hydroxyl groups on the collective surfaces thereof are suspended in toluene and 2,4-toluene diisocyanate, in the quantity necessary to provide about 3 isocyanate groups per each hydroxyl group, is incrementally added at a rate slow enough to keep the temperature of the reaction mix below 32° C. After the initial exotherm subsides, the reaction mixture is stirred for 1 hour.

(IV) The rubber-diisocyanate adduct is reacted with a hydroxyalkyl acrylate using the following procedure: the temperature of the reaction mix is raised to about 45° C. and hydroxyethyl methacrylate monomer is added in slight excess (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent. The rubber-urethane-acrylate product, hereinafter referred to as resin, is ready for employment in the coating compositions.

(V) Paint dispersions are prepared from the rubber-urethane-acrylate resin, vinyl monomers and an alpha-beta, olefinically unsaturated, polyester resin prepared by the following procedure:

| Reactants | Moles | Grams |
|---|---|---|
| Maleic anhydride | 3.6 | 353 |
| Tetrahydrophthalic anhydride | 6.4 | 973.8 |
| Neopentyl glycol | 9.395 | 978.40 |
| Diallyl ether of pentaerythritol | 2.81 | 607.8 |

A fusion cook of the neopentyl glycol and the tetrahydrophthalic anhydride is carried out over a 21 hour period. Water comes over at about 157° C. and a maximum temperature of about 205° C. is recorded. The resulting resin has an acid number of about 17. The maleic anhydride and the diallyl ether of pentaerythritol are added with about 1.46 grams hydroquinone and the charge is heated for about 13 hours. Water comes over at about 140° C. and a maximum temperature of about 186° C. is recorded.

A first paint dispersion is prepared using 50 parts by weight of this polyester resin, 25 parts by weight of the rubber-urethane-acrylate resin and about 25 parts by weight methyl methacrylate. A second paint dispersion is prepared using about 25 parts by weight of this polyester resin, about 50 parts by weight of the rubber-urethane-acrylate resin, and about 25 parts by weight methyl methacrylate. A third paint dispersion is prepared using about 30 parts by weight of this polyester resin, about 10 parts by weight of the rubber-urethane-acrylate resin and about 60 parts by weight methyl methacrylate. A fourth paint dispersion is prepared using about 40 parts by weight of this polyester resin, about 5 parts by weight of the rubber-urethane-acrylate resin and about 55 parts by weight of methyl methacrylate.

(VI) Coating of substrates: the dispersions prepared in V above are separately coated on substrates of steel, wood, glass and polymeric solid, i.e., acrylonitrile-butadiene-styrene copolymer, to an average depth of about 7/10 mil (0.0007 inch) and irradiated with an electron beam. The conditions of irradiation are as follows:

Potential _____ kv__ 275
Current _____ milliamperes__ 30
Distance, emitter from workpiece _____ inches__ 10
Dose _____ mrad__ 10
Atmosphere _____ Nitrogen

EXAMPLE 2

The procedure of Example 1 is repeated with the differences that an equimolar amount of ethyl acrylate is substituted for the butyl acrylate used in the first monomer mixture to form the core of the graded rubber particle and one half of the methyl methacrylate used to form the coating dispersions with the polyester and the rubber-urethane-acrylate addition product is replaced with an equimolar amount of styrene.

EXAMPLE 3

The procedure of Example 1 is repeated with the differences that an equimolar amount of 2-ethyl hexyl acrylate is substituted for the butyl acrylate used in the first monomer mixture to form the core of the graded rubber particle, the second monomer mixture used to form the shell of the graded rubber particles is a mixture of about 40 mole percent methyl methacrylate, 15 mole percent ethyl acrylate, 10 mole percent butyl acrylate, 10 mole percent acrylonitrile, 25 mole percent hydroxyethyl acrylate, and the vinyl monomer component used to form the coating dispersion with the rubber-urethane-acrylate addition product and the polyester resin is a mixture of 30 mole percent methyl methacrylate, 20 mole percent butyl methacrylate, 10 mole percent 2-ethyl hexyl acrylate, 20 mole percent styrene and 20 mole percent vinyl toluene. The second monomer mixture is divided into four equal fractions each of which is added incrementally. The hydroxyethyl acrylate is added to the reaction mixture with the last of these fractions.

EXAMPLE 4

The procedure of Example 1 is repeated with the difference that an equimolar amount of cyclohexyl acrylate is substituted for the butyl acrylate and an equimolar amount of 1,3-butylene diacrylate is substituted for the 1,3-butylene dimethacrylate used in the first monomer mixture to form the core of the graded rubber particles, the second monomer mixture used to form the shell of the graded rubber particles is a mixture of 30 mole percent methyl methacrylate, 15 mole percent methacrylonitrile, 10 mole percent styrene, 10 mole percent 1,3-butylene dimethacrylate, 5 mole percent vinyl acetate, and 30 mole percent hydroxypropyl methacrylate, and the vinyl monomer component used to form the coating dispersion with the rubber-urethane-acrylate addition product and the polyester resin is a mixture of 70 mole percent methyl methacrylate, 20 mole percent alpha methyl styrene and 10 mole percent 1,3-butylene dimethacrylate.

EXAMPLE 5

The procedure of Example 1 is repeated with the difference that an equimolar amount of 1,6-hexamethylene diacrylate is substituted for the 1,3-butylene dimethacrylate used in the first monomer mixture to form the core of the graded rubber particle.

EXAMPLE 6

The procedure of Example 1 is repeated with the differences that an equimolar amount of divinyl benzene is substituted for the 1,3-butylene dimethacrylate used in the first monomer mixture to form the core of the graded rubber particle, the second monomer mixture used to form the shell of said particle is a mixture of 50 mole percent methyl methacrylate, 10 mole percent acrylonitrile, 10 mole percent divinyl benzene, and 30 mole percent hydroxypropyl acrylate, and the vinyl monomer component used to form the coating dispersion with the rubber-urethane-acrylate addition product and the polyester resin is a mixture of 60 mole percent methyl methacrylate, 20 mole percent styrene, 10 mole percent butyl acrylate and 10 mole percent divinyl benzene.

EXAMPLE 7

The procedure of Example 1 is repeated with the difference that a single paint dispersion is formed using 60 weight percent of the methyl methacrylate and 40 weight percent of a polymeric component of which 50 weight percent is the rubber-urethane-acrylate addition product and 50 weight percent is the polyester resin.

EXAMPLE 8

The procedure of Example 1 is repeated with the difference that a single paint dispersion is formed using 40 weight percent of the methyl methacrylate and 60 weight percent of a polymeric component which is made up of 50 weight percent of the rubber-urethane-acrylate addition product and 50 weight percent of the polyester resin.

EXAMPLE 9

The procedure of Example 1 is repeated except for the differences that the second monomer mixture introduced into the reaction mixture to form the shell of the hydroxy-functional graded rubber product is a mixture of about 95 mole percent methyl methacrylate and about 5 mole percetn hydroxyethyl methacrylate. The second monomer mixture is divided into 10 equal fractions each of which is added incrementally. The hydroxyethyl methacrylate is added to the reaction mixture with the last 1/10 of the monomer mixture.

EXAMPLE 10

The procedure of Example 1 is repeated except for the differences that the second monomer mixture introduced into the reaction mixture to form the shell of the hydroxy-functional graded rubber product is a mixture of about 85 mole percent methyl methacrylate and about 15 mole percent hydroxyethyl acrylate. The second monomer mixture is divided into 5 equal fractions each of which is added incrementally. The hydroxyethyl acrylate is added to the reaction mixture with the last one fifth of the monomer mixture.

EXAMPLE 11

The procedure of Example 1 is repeated with the differences that the curing is carried out in a helium atmosphere and the potential of the electron beam upon the electron window into such atmosphere is about 260 kv.

EXAMPLE 12

The procedure of Example 1 is repeated with the differences that the curing is carried out in a nitrogen atmosphere containing a minor amount of $CO_2$ and the potential of the electron beam upon exiting from the electron window into such atmosphere is about 295 kv.

EXAMPLE 13

Substrates are coated in accordance with this invention using the following procedure:
(I) Graded rubber particles are prepared in an organic medium using the procedure set forth below:
(A) A mixture is formed from the following:

| Materials: | Grams |
|---|---|
| Ethyl acrylate | 400 |
| 1,3-butylene dimethacrylate | 100 |
| Dispersing agent [1] | 15 |
| AIBN [2] | 5 |

[1] An amphipatic copolymer (1 portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using AIBN initiator (9 g.) and butyl acetate solvent. This method of producing this dispersing agent is described in detail by K. E. J. Barratt and H .R. Thomas, Journal of Polymer Science, Part A–1, vol. 7, 2625 (1969). Other dispersing agents which are effective for stabilizing suspensions in hydrocarbon liquids may be used in place of the above described material.
[2] 2,2' azobis-(2-methyl propionitrile).

(B) The mixture of the above listed material is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
|---|---|
| Methyl methacrylate | 320.0 |
| Hydroxyethyl methacrylate | 80.0 |
| Dispersing agent [1] | 3.0 |
| AIBN | 6.0 |
| n-Dodecane | 1000.0 |

[1] Same as 1 A(1).

(II) The hydroxy-functional graded particles prepared in I above are reacted with a diisocyanate using the following procedure: The temperature of the reaction mixture is allowed to cool to 30° C. There is slowly added 132 grams of 2,4-toluene diisocyanate. The temperature is maintained in the range of 30°–35° C. for two hours.

(III) There is added to the reaction mix 125 grams of hydroxyethyl methacrylate. The reaction mix is then heated at 45° C. for 4 hours. The rubber-urethane-acrylate addition product particles are separated from the solvent by filtration.

(IV) A paint dispersion is prepared using 40 parts by weight of an equimolar mixture of methyl methacrylate and styrene, and 60 parts by weight of a polymeric component consisting of 58 parts by weight of an alpha-beta olefinically unsaturated polyester resin[1] and 2 parts by weight of the rubber-urethane-acrylate addition product.

Procedure

All of the reactants are charged to a four neck flask fitted with a stirrer, thermometer, a nitrogen inlet tube and a 10 inch vigreaus column topped with a Barrett trap for removing the water of condensation. The reactants are slowly heated to 165° C. at which time the first water of condensation distills off. Nitrogen is bubbled through the reactants throughout the reaction. The reaction temperature rises as water is continuously removed until a maximum temperature of 225° C. is attained. The column is then removed from the system, 3 weight percent xylene is added to aid azeotropic water removal and heating is continued until the acid number reaches 30. The product is cooled and when the temperature reaches 100° C., 0.03 weight percent hydroquinone inhibiter is added.

(V) Coating of substrates: The paint dispersion prepared in IV is sprayed upon substrates of steel, aluminum, glass, paper, wood and polymeric solid, i.e., polypropylene, to an average depth of about 1.5 mil and cured thereon by placing said substrates into a nitrogen atmosphere and exposing the coated surfaces to an electron beam (potential 275 kv.-current 30 milliamperes) until the coatings are crosslinked upon the surfaces of the substrates and/are tack-free to the touch.

EXAMPLE 14

The procedure of Example 13 is repeated with the differences that an equimolar amount of 4,4′ diphenylmethane diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised about 150° C. and maintained at a temperature of about 150° C. while the reaction mixture is stirred for about 30 minutes.

EXAMPLE 15

The procedure of Example 13 is repeated with the differences that an equimolar amount of 1-phenoxy-2,4-phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 16

The procedure of Example 13 is repeated with the differences that an equimolar amount of 1-tert-butyl-2,4-phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-ethyl-2,4-phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 18

The procedures of Examples 1 and 13 are repeated with the differences that the alpha-beta olefinically unsaturated polyester is prepared from the following materials using the following procedures:

| Materials: | Parts by weight |
| --- | --- |
| Maleic anhydride | 14.7 |
| Tetrahydrophthalic anhydride | 72.3 |
| Neopentyl glycol | 75.0 |
| Dibutyl tin oxide | 7.06 |

Procedure

To a reaction vessel, the reactants are charged and then heated to about 340° F. and held at this temperature for one hour. The temperature of the charge is then raised to about 440° F. and maintained at such temperature until acid number of the resultant resin is below about 20. The excess glycol and water of reaction are removed by vacuum and when the acid number is below about 10 there are added about 14.5 grams hydroquinone. The charge is allowed to cool.

EXAMPLE 19

The procedure of Example 18 is repeated except that a functionally equivalent amount of 1,2-cyclohexene dicarboxylic acid anhydride is substituted for the tetrahydrophthalic anhydride (4 - cyclohexene-1,3-dicarboxylic anhydride).

EXAMPLE 20

The procedure of Example 18 is repeated except that ⅕ of the neopentyl glycol is replaced with a functionally equivalent amount of pentaerythritol.

EXAMPLE 21

The procedure of Example 18 is repeated except that a functionally equivalent amount of ethylene glycol is substituted for the neopentyl glycol.

EXAMPLE 22

The procedure of Example 18 is repeated except that a functionally equivalent amount of 2-butene-1,4 diol is substituted for the neopentyl glycol.

EXAMPLE 23

The procedure of Example 18 is repeated except that a functionally equivalent amount of 1,6-hexamethylene glycol is substituted for the neopentyl glycol.

EXAMPLE 24

The procedure of Example 18 is repeated except that a functionally equivalent amount of fumaric acid is substituted for the maleic anhydride.

---

[1] This polyester resin is prepared from the following materials using the following procedure:

| Materials: | Parts by wt. |
| --- | --- |
| Maleic anhydride | 147 |
| Phthalic anhydride | 429 |
| Neopentyl glycol | 503 |

EXAMPLE 25

The procedure of Example 18 is repeated except that a functionally equivalent amount of chloromaleic anhydride is substituted for the maleic anhydride.

EXAMPLE 26

The procedures of Examples 1 and 13 are repeated with the differences that the alpha-beta olefinically unsaturated polyester is prepared from the following materials using the following procedures:

| Materials | Mols | Grams |
|---|---|---|
| Succinic acid | 2.88 | 340.1 |
| Tetrahydrophthalic anhydride | 9.12 | 1387.6 |
| 1,2-propanediol | 13.20 | 1004.4 |

The monomers with 200 cc. xylene are subjected to a solvent cook over a period of 8 hours gradually raising the temperature to 260° C. The resultant resin has an acid number of about 14. The mixture is then cooled to about 90° C. Then 90 grams of dibutyl tin oxide, 370 grams of 2-hydroxyethyl methacrylate, and ten grams of hydroquinone are added. The esterification reaction is continued until the acid value is about 4.5.

EXAMPLE 27

The procedures of Examples 1 and 13 are repeated with the differences that the alpha-beta olefinically unsaturated polyester is prepared from the following materials using the following procedures:

| Materials | Mols | Grams |
|---|---|---|
| Succinic acid | 2.88 | 340.1 |
| Tetrahydrophthalic anhydride | 9.12 | 1387.6 |
| 1,2-propanediol | 13.20 | 1004.4 |

The monomers with 200 cc. xylene are subjected to a solvent cook over a period of 10 hours gradually raising the temperature to 260° C. The resultant resin, Resin A, has an acid number of about 5.7. The xylene is separated from the resin and a solution of the resin and styrene is prepared to which is sequentially added toluene diisocyanate and 2-hydroxyethyl methacrylate. The composition of this reaction mixture is as follows:

| Materials | Mols | Grams |
|---|---|---|
| Resin A | | 2 |
| Toluene diisocyanate | 0.1 | 17.4 |
| Styrene | 0.82 | 86 |
| 2-hydroxyethyl methacrylate | 0.1 | 13 |

The addition of the diisocyanate is made slowly and incrementally and the charge is continuously stirred over a period of 5.5 hours to form Resin B. The methacrylate is then added slowly and incrementally and the charge is continuously stirred over a period of 25 hours to form Resin C.

The monomer content is adjusted in accordance with the monomer contents set forth in Examples 1 and 13 by addition of styrene where necessary and the removal of styrene by vacuum distillation where necessary. To this resin monomer mix is then added the graded rubber-urethane-acrylate addition products in the amounts employed in Examples 1 and 13 respectively. The composition is applied to substrates and cured in accordance with the procedures of Examples 1 and 13 respectively.

EXAMPLE 28

The procedures of Examples 1 and 13 are repeated with the differences that the alpha-beta olefinically unsaturated polyester employed is a siloxane-modified polyester prepared from the following materials using the following procedures:

To a reaction vessel are charged 70 pounds of neopentyl glycol, 10 pounds of xylene and 35 pounds of a commercially available (Dow Corning Z–6018) hydroxy-functional, cyclic, polysiloxane having the following properties:

Hydroxy content, Dean-Stark:
  Percent condensable _____ 5.5
  Percent free _____ 0.5
Average molecular weight _____ 1600
Combining weight _____ 400
Refractive index _____ 1.531–1.539
Softening point, Durran's mercury method, ° F. ___ 200
At 60% solids xylene:
  Specific gravity at 77° F. _____ 1.075
  Viscosity at 77° F., centipoises _____ 33
  Gardner-Holdt _____ A–1

The charge is heated to about 345° F. (174° C.) for 2½ hours, after which there is added 13.7 lbs. maleic anhydride, 52.4 lbs. tetrahydrophthalic anhydride and 100 grams of dibutyl tin oxide.

The temperature of the charge is raised slowly to about 430° F. (221° C.) and this temperature is maintained until the resulting resin has an acid number of about 10. Some of the xylene and water of reaction are removed during the cook and the excess is then removed by vacuum. To the charge is added 12.6 grams hydroquinone and the charge is cooled.

EXAMPLE 29

The procedure of Example 1 is repeated with the difference that the paint dispersion consists of 40 parts by weight of an equimolar mixture of methyl methacrylate and styrene and 60 parts by weight of a polymeric component consisting of 55 parts by weight of the alpha-beta olefinically unsaturated polyester resin and about 5 parts by weight of the rubber-urethane-acrylate addition product.

EXAMPLE 30

The procedure of Example 13 is repeated with the difference that the paint dispersion consists of 40 parts by weight styrene and 60 parts by weight of a polymeric component consisting of 50 parts by weight of the alpha-beta olefinically unsaturated polyester resin and about 10 parts by weight of the rubber-urethane-acrylate addition product.

EXAMPLE 31

The procedure of Example 1 is repeated with the difference that the paint dispersion consists of 40 parts by weight methyl methacrylate and styrene in equimolar mixture and 60 parts by weight of a polymeric component consisting of 5 parts by weight of the alpha-beta olefinically unsaturated polyester resin and 55 parts by weight of the rubber-urethane-acrylate addition product.

EXAMPLE 32

The procedure of Example 13 is repeated with the difference that the paint dispersion consists of 60 parts by weight of a vinyl monomer mixture made up of 30 mole percent methyl methacrylate, 20 mole percent ethyl acrylate, 10 mole percent butyl methacrylate, 10 mole percent butyl acrylate, 15 mole percent 2-ethyl hexyl acrylate and 15 mole percent styrene and 40 parts by weight of a polymeric component consisting of about 10 parts by weight of the olefinically unsaturated polyester resin and about 50 parts by weight of the rubber-urethane-acrylate addition product.

EXAMPLE 33.

The procedures of Examples 1 and 13 are repeated except that the depth of coating is varied in separate tests using films of 0.2, 0.5, 1.0, 2.0 and 3.5 mils. Irradiation is continued until the films are tack-free to the touch.

EXAMPLE 34

The procedures of Examples 1 and 13 are repeated except for the difference that a functionally equivalent amount of 1,1,1-trimethylolethane triacrylate is substituted for the 1,3-butylene dimethacrylate in the formation of the hydroxy-functional rubber particle.

EXAMPLE 35

The procedures of Examples 1 and 13 are repeated except for the difference that a functionally equivalent amount of 1,1,1-trimethylolpropane, trimethacrylate is substituted for the 1,3-butylene dimethacrylate in the formation of the hydroxy-functional rubber particle.

EXAMPLE 36

The procedures of Examples 1 and 13 are repeated except for the difference that a functionally equivalent amount of 1,4-dimethylolcyclohexane dimethacrylate is substituted for the 1,3-butylene dimethacrylate in the formation of the hydroxy-functional rubber particle.

The terms "acrylate" and "acrylates," when used herein without a modifier distinguishing between esters of acrylic acid and methacrylic acid, shall be understood to include both. This, of course, does not apply to a naming of a specific compound.

It will be understood by those skilled in the art that modifications can be made within the foregoing examples in the scope of the invention as hereinbefore described and hereinafter claimed:

What is claimed is:

1. A radiation-curable paint which on a pigment and mineral filler-free basis comprises a film-forming dispersion of about 20 to about 80 weight percent vinyl monomers and about 80 to about 20 weight percent of a polymeric component consisting essentially of (A) about 2 to about 98 weight percent of an alpha-beta olefinically unsaturated polyester resin having average molecular weight in excess of about 1,000 and containing about 0.5 to about 5 units of alpha-beta olefinic unsaturation per 1,000 units molecular weight and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of
    (1) a core of crosslinked acrylic polymer consisting essentially of
        (a) about 80 to about 98 mole percent of an ester of acrylic acid and a $C_2$–$C_8$ monohydric alcohol, and
        (b) about 2 to about 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol.
    (2) an outer shell having glass transition temperature at least 50° C. above that of said core and consisting essentially of the polymerization product of monomer mixtures selected from the group consisting of
        (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate, and
        (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate.

2. A paint in accordance with claim 1 wherein said core is crosslinked acrylic polymer consisting essentially of butyl acrylate and 1,3-butylene dimethacrylate.

3. A paint in accordance with claim 1 wherein said core is a crosslinked acrylic polymer consisting essentially of 2-ethyl hexyl acrylate and 1,3-butylene dimethacrylate.

4. A paint in accordance with claim 1 wherein said hydroxyalkyl acrylate is selected from hydroxyethyl acrylate, hydroxyethyl methacrylate, hydroxyproyl acrylate and hydroxypropyl methacrylate.

5. A paint in accordance with claim 1 wherein said vinyl monomers are selected from esters of acrylic or methacrylic acid and a $C_1$–$C_8$ monohydric alcohol, $C_8$–$C_9$ monovinyl hydrocarbons, and 0 to 30 mole percent of a difunctional compound selected from divinyl benzene and diesters of acrylic or methacrylic acid and a $C_2$–$C_6$ dihydric alcohol.

6. A paint in accordance with claim 1 wherein the graded rubber particles used to form said rubber-urethane acrylate addition product have average diameter in the range of about 0.04 to about 1 micron.

7. A paint in accordance with claim 1 wherein said film-forming dispersion consists essentially of about 25 to about 75 weight percent vinyl monomers and about 75 to about 25 weight percent of said polymeric component.

8. A radiation-curable paint which on a pigment and mineral filler-free basis comprises a film-forming dispersion of about 25 to about 75 weight percent vinyl monomers and about 75 to about 25 weight percent of a polymeric component consisting essentially of (A) about 5 to about 95 weight percent of an alpha-beta olefinically unsaturated polyester resin having average molecular weight in the range of about 2,000 to about 10,000 and containing about 0.7 to about 3.5 units of alpha-beta olefinic unsaturation per 1,000 units molecular weight and (B) about 95 to about 5 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of
    (1) a core of crosslinked acrylic polymer consisting essentially of
        (a) about 80 to about 98 mole percent of an ester of acrylic acid and a $C_2$–$C_8$ monohydric alcohol, and
        (b) about 2 to about 20 mole percent of divinyl benzene or a diester of acrylic or methacrylic acid and a $C_2$–$C_8$ dihydric alcohol,
    (2) an outer shell having glass transition temperature at least 50° C. above that of said core consisting essentially of the polymerization product of monomer mixtures selected from the group consisting of
        (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate, and
        (b) about 5 to about 30 mole percent of a hydroxy-functional acrylate selected from hydroxyethyl acrylate, hydroxyethyl methacrylate, hydroxypropyl acrylate and hydroxpropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate.

9. The method of coating a substrate which comprises (I) applying to a surface of said substrate a film of radiation-curable paint which on a pigment and mineral filler-free basis comprises a film-forming dispersion of about 20 to about 80 weight percent vinyl monomers and about 80 to about 20 weight percent of a polymeric component consisting essentially of (A) about 2 to about 98 weight percent of an alpha-beta olefinically unsaturated polyester resin having average molecular weight in excess of about 1,000 and containing about 0.5 to about 5 units of alpha-beta olefinic unsaturation per 1,000 units molecular weight and (B) about 98 to about 2 weight percent of a rubber-urethane-acrylate addition product formed by reacting a first isocyanate group of a diisocyanate with a hydroxyfunctional particle of graded rubber and reacting the remaining isocyanate group of said diisocyanate with a hydroxyalkyl acrylate, said particle of graded rubber consisting essentially of
 (1) a core of crosslinked acrylic polymer consisting essentially of
  (a) about 80 to about 98 mole percent of an ester of acrylic acid and a $C_2$–$C_8$ monohydric alcohol, and
  (b) about 2 to 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol.
 (2) an outer shell having glass transition temperature at least 50° C. above that of said core and consisting essentially of the polymerization product of monomer mixtures selected from the group consisting of
  (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate, and
  (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate,
and (II) crosslinking said film upon said substrate by exposing said substrate to a beam of electrons having average energy in the range of about 100,000 to about 500,000 electron volts.

10. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers and about 80 to about 20 weight percent of a polymeric momponent of (A) about 2 to about 98 percent of an alpha-beta olefinically unsaturated polyester resin having average molecular weight in excess of about 1,000 and containing about 0.5 to about 5 units of alpha-beta olefinic unsaturation per 1,000 units molecular weight and (B) about 98 to about 2 weight percent of a rubber-urethane-acrylate addition product formed by reacting a first isocyanate group of a diisocyanate with a hydroxyfunctional particle of graded rubber and reacting the remaining isocyanate group of said diisocyanate with a hydroxyalkyl acrylate, said particle of graded rubber consisting essentially of
 (1) a core of crosslinked acrylic polymer consisting essentially of
  (a) about 80 to about 98 mole percent of an ester of acrylic acid and a $C_2$–$C_8$ monohydric alcohol, and
  (b) about 2 to about 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol.
 (2) an outer shell having glass transition temperature at least 50° C. above that of said core and consisting essentially of the polymerization product of monomer mixtures selected from the group consisting of
  (a) about 70 to about 95 mole percent methyl methacrylate and about 5 to about 30 mole percent of a hydroxy-functional acrylate selected from hydroxyethyl acrylate, hydroxymethacrylate, hydroxypropyl acrylate and hydroxypropyl methacrylate, and
  (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate.

References Cited
UNITED STATES PATENTS

| | | | |
|---|---|---|---|
| 3,509,234 | 4/1970 | Burlant et al. | 260—859 |
| 3,528,844 | 9/1970 | Burlant | 117—93.31 |

ALFRED L. LEAVITT, Primary Examiner

J. H. NEWSOME, Assistant Examiner

U.S. Cl. X.R.

117—161 A, 161 K, 161 KP; 204—159.19; 260—859